US008056452B2

(12) United States Patent
Serwuschok (10) Patent No.: US 8,056,452 B2
(45) Date of Patent: Nov. 15, 2011

(54) METHOD OF MACHINING CRANKSHAFTS AND A CRANKSHAFT MACHINING TOOL INSERT THEREFOR

(75) Inventor: Klaus Serwuschok, Arberg (DE)

(73) Assignee: Kennametal Widia Produktions GmbH & Co. KG, Essen (DE)

( * ) Notice: Subject to any disclaimer, the term of this patent is extended or adjusted under 35 U.S.C. 154(b) by 674 days.

(21) Appl. No.: 12/245,361

(22) Filed: Oct. 3, 2008

(65) Prior Publication Data

US 2009/0249926 A1 Oct. 8, 2009

Related U.S. Application Data

(63) Continuation-in-part of application No. PCT/DE2007/000598, filed on Apr. 3, 2007.

(30) Foreign Application Priority Data

Apr. 6, 2006 (DE) .......................... 10 2006 016 626

(51) Int. Cl.
*B23B 1/00* (2006.01)
*B23B 21/00* (2006.01)
(52) U.S. Cl. ....................................... 82/1.11; 407/113
(58) Field of Classification Search ................... 82/1.11; 407/113, 114, 42, 34; 409/131, 38, 51, 52; 76/101.1
See application file for complete search history.

(56) References Cited

U.S. PATENT DOCUMENTS

| 3,776,655 | A | * | 12/1973 | Urbanic | 408/1 R |
| 3,875,631 | A | * | 4/1975 | Malinchak | 407/113 |
| 4,610,186 | A | * | 9/1986 | Schmidt | 76/101.1 |
| 4,655,648 | A | * | 4/1987 | Hellbergh | 407/42 |
| 4,794,665 | A | | 1/1989 | Peters | |
| 4,867,616 | A | | 9/1989 | Jakubowicz | |
| 5,924,825 | A | * | 7/1999 | Schwab et al. | 407/42 |
| 6,632,051 | B1 | * | 10/2003 | Wermeister | 407/114 |

FOREIGN PATENT DOCUMENTS

| DE | 41 35 681 | 5/1993 |
| EP | 0 542 026 | 5/1993 |
| EP | 1 087 853 | 4/2001 |
| JP | 07 314205 | 12/1995 |

OTHER PUBLICATIONS

International Search Report PCT/DE2007/000598 and English translation thereof.

* cited by examiner

*Primary Examiner* — Will Fridie, Jr.
(74) *Attorney, Agent, or Firm* — Larry R. Meenan (57) ABSTRACT

A method of machining a crankshaft using a machine tool arrangement having a cutting insert comprising a first plurality of cutting teeth comprising a rounded cutting tooth being disposed at the intersection of a first contoured side surface and a first planar side surface; and second plurality of cutting teeth comprising a rounded, corner cutting tooth being disposed at the intersection of said second contoured side surface and a second planar side surface.

20 Claims, 8 Drawing Sheets

METHOD OF MACHINING CRANKSHAFTS AND A CRANKSHAFT MACHINING TOOL INSERT THEREFOR

CONTINUING APPLICATION DATA

This application is a Continuation-In-Part application of International Patent Application No. PCT/DE2007/000598, filed on Apr. 3, 2007, which claims priority from Federal Republic of Germany Patent Application No. 10 2006 016 626.4, filed on Apr. 6, 2006. International Patent Application No. PCT/DE2007/000598 was pending as of the filing date of this application. The United States was an elected state in International Patent Application No. PCT/DE2007/000598.

BACKGROUND

1. Technical Field

The present application relates to a method of machining crankshafts. The present application further relates to a cutting insert for use in the method, which cutting insert has a prismatic basic shape and has a top and a bottom surface which are arranged parallel or relatively parallel to one another and are connected by four side faces which are arranged perpendicularly or relatively perpendicularly thereto. The cutting insert also has two opposite side faces that have projecting and recessed sections, which together with the top and the bottom surface form respective cutting edges, and two other opposite side faces that are arranged in a planar manner and parallel or relatively parallel to one another.

The present application also relates to a method of machining rotated workpieces, possibly crankshafts, in which at least one cutting insert is first being fed in onto the workpiece in the radial direction and then being moved relative to the workpiece in the axial direction.

2. Background Information

Background information is for informational purposes only and does not necessarily admit that subsequently mentioned information and publications are prior art.

Some methods of machining rotationally symmetrical workpiece surfaces, such as crankshafts, involve rotating the workpiece surface during the machining, then first rough-machining by means of cutting tips, and then finish-machining by means of at least one further cutting tip, wherein the workpiece surface to be machined, during the finish machining, is machined by the longitudinal turning process by the further cutting tip moved in the axial direction of the workpiece surface. The tool having the further cutting tip is fed in radially to the workpiece surface during the finish machining, the longitudinal turning being effected by means of at least two lips of the further cutting tip which lie axially next to one another at a distance apart and work essentially simultaneously. The tool used for this purpose has a tool parent body on which at least one cutting tip for the rough machining and at least one further cutting tip for the finish machining are to be arranged. Said further finishing tip has, for the finish machining by longitudinal turning, at least two lips lying next to one another at an axial distance apart, possibly a cutting edge having a tooth-like profile, in which a multiplicity of lips lying next to one another at a distance apart each have a triangular shape. The points formed by these triangular lips lie in one plane.

In other words, one method of machining a crankshaft involves placing a workpiece in a rotating device which holds and rotates the workpiece in the style of a lathe. A cutting tool with a cutting insert or tip is moved radially, i.e. is moved in a direction corresponding to a radius extending perpendicularly to the longitudinal rotational axis of the workpiece, towards and into the workpiece. This first cutting insert engages and cuts a portion of the workpiece as the workpiece rotates as part of a rough machining or cutting process. The first cutting insert is then removed upon completion of the cutting process, and a second cutting tool with another cutting insert, such as a comb-shaped cutting insert, is moved radially toward the workpiece. This second cutting insert also initially contacts the workpiece in a radial direction, however, it is then moved in a substantially axial direction, i.e. in a direction parallel to the longitudinal rotational axis of the workpiece. In this manner the second cutting insert cuts across the face or exterior of the workpiece in a finish machining or cutting process.

Some tools are provided with cutting tips which lie one behind the other in the circumferential direction and with which different machining operations can be carried out on a crankshaft. Rough machining is effected using a first set of, for example, four cutting tips, during which rough machining, in the example cited, cutting inserts which are rectangular in plan view of the rake face are fed in radially in the direction of a crankshaft. Once the crankshaft has been machined by the recessing process to such an extent that a journal circumferential surface having lateral oil collars has approximately developed, a cutting tip having a plurality of triangular cutting edges is fed in onto the workpiece for the finishing and is moved in a longitudinally axial manner for the longitudinal turning.

Some cutting inserts with prismatic basic shapes have two essentially parallel, top and bottom surfaces and at least three side faces which run essentially perpendicularly to the top and bottom surfaces. A cutting edge is formed at the interface between at least one side face and the top or bottom surface. The relevant side face is not planar and has alternately arranged projecting and recessed sections, whereby effective sections of main cutting edges are formed at least in the region of the projecting sections. Extending between these main cutting edges are sloping secondary cutting edges which are angled relative to the main cutting edges partly by 60 degrees and in the corner regions by 45 degrees. Furthermore, the rake faces are formed by recesses assigned to each section of a main cutting edge, an angle between the rake face and the main flank within the range of 62 degrees to 72 degrees being obtained in the central region of a main cutting edge.

These cutting inserts may be fitted on a milling tool in such a way that their main cutting edges overlap slightly and the main cutting edges of one cutting insert mutually cover the recessed regions of a following cutting insert, such that the secondary cutting edges come into engagement with the workpiece with only or substantially only their regions directly or relatively adjoining the main cutting edges. A corresponding tool is provided solely for infeed in the radial direction in order to mill, for example, grooves or the like in a workpiece.

One problem is how to provide a method of machining workpieces in which the cutting insert is to be fed in both radially and axially during the machining of workpieces, wherein the corresponding workpiece surfaces are to be produced efficiently and in good quality, i.e. with low tolerances.

According to one possible method, at least one cutting insert is to be used for producing rotationally symmetrical surfaces. Possibly, this cutting insert is to comprise certain angles, namely a first angle which is formed between the rake faces and the plane of the main flanks, this plane being defined by the regions of the side face adjoining the main cutting edge, and which is to be between 72 degrees and 76 degrees, and furthermore an angle between 75 degrees and 70 degrees between the secondary cutting edges and the main cutting edge and an angle of inclination of the cutting insert at which an effective clearance angle of 8 degrees to 12 degrees is formed. It is emphasized that the selection of such angles firstly makes possible a positive cutting geometry during both the radial and the axial infeed to the workpiece, and in addition reaction forces which occur could be kept relatively small. Such tool is also only suitable for fine machining.

There is therefore the disadvantage with the above-mentioned methods that first, to produce the bearing of a crankshaft, rough machining is carried out using a first cutting insert. To this end, a "triangular indexable insert" having a corner radius of 1.2 millimeters is often used. Then, for the fine machining, one of the cutting inserts described above having a comb-like cutting edge is used, with which the final contour of the bearing root is machined by a longitudinal turning process. In order to be able to produce a crankshaft, a certain number of cutting inserts having different geometries and in different grades should be kept in stock. The number of different types of indexable insert variants is not inconsiderable, which may disadvantageously result in the risk of mix-ups during fitting, with costly malfunctioning of the fitted tools. The multiplicity of cutting inserts desired also results in long setting-up times. Ultimately, the tool costs have a substantial effect on the production costs of the workpieces to be machined.

OBJECT OR OBJECTS

The object of at least one possible embodiment of the present application is to avoid or minimize the abovementioned disadvantages. Another possible object is to provide a cutting insert in which the machining of rotated workpieces, such as crankshafts or camshafts, can be arranged more effectively. The same correspondingly applies to the provision of a method for machining such workpieces.

SUMMARY

This object is achieved by a cutting insert which has a prismatic basic shape and has a top and a bottom surface, which are arranged parallel to one another and are connected by four side faces which are arranged perpendicularly thereto. Also, the cutting insert has two opposite side faces with projecting and recessed sections, which together with the top and the bottom surface form respective cutting edges, and of which the two other opposite side faces are arranged in a planar manner and parallel to one another, wherein at least one cutting corner formed by two side faces adjoining one another is designed as a cutting edge. The object is also achieved by a method of machining rotated workpieces, possibly crankshafts, where at least one cutting insert first is fed in onto the workpiece in the radial direction and then is moved relative to the workpiece in the axial direction, wherein the cutting insert is first moved radially for facing a center bearing and is then moved axially for the finish machining of a bearing root.

According to at least one possible embodiment of the present application, the cutting insert has a top and a bottom surface which are arranged parallel or relatively parallel to one another and four side faces which are arranged perpendicularly or relatively perpendicularly thereto and of which two opposite side faces have projecting and recessed sections and of which the two other opposite side faces are arranged in a planar manner and parallel or relatively parallel to one another. At least one cutting corner formed by two side faces adjoining one another is designed as a cutting edge. Adjoining the comb-like cutting edge, on one side is a corner cutting edge which is suitable for the facing of the center bearing in a first operation during the recessing, after which the comb-like cutting edge is used during the longitudinal turning by longitudinal axial displacement. Such a design allows the hitherto used cutting inserts which have a triangular or rectangular rake face in plan view and which were used in the first operation to be completely dispensed with. The novel cutting insert therefore provides a combination tool which not only offers cost advantages, since considerably fewer indexable inserts are required for the crankshaft machining, but also allows storage capacity to be saved. The risk of mix-ups in the sense of incorrect fitting is also reduced by the use of this combination tool. Finally, the setting-up times are shorter, since one indexable insert has to be fitted instead of previously two respective indexable inserts.

Finally, the effectiveness of the machining is increased due to the fact that the various cassette variants of the hitherto used different cutting inserts for the rough and the fine machining are replaced by one cassette type having the cutting tip according to at least one possible embodiment of present application. Halving the requisite cassettes therefore likewise results in cost advantages. Ultimately, the machining time within a process line can be shortened, since the swivel time between the cassette having the first indexable insert and the cassette having the comb-like indexable insert is saved.

Further embodiments and advantages are discussed further herein below.

Thus, the cutting corner according to at least one possible embodiment is of round design and has a corner radius in the range of 0.3 millimeter to 0.5 millimeter, or in another possible embodiment is 0.4 millimeter. Further optimization in the sense of an indexable insert is achieved by two respective diametrically opposite cutting corners being arranged on the top and the bottom surface, i.e., per cutting insert, four cutting corners with four comb-like cutting edges adjoining here. The cutting corners possibly define an essentially semicylindrical section on the side faces. Regarding the comb-like cutting edge, the projecting and recessed sections are possibly of trapezoidal design as viewed in plan view, wherein, in accordance with at least one possible embodiment, the projecting sections lie next to one another and form main cutting edges which lie in a line and which each merge laterally into secondary cutting edges which enclose an angle of 120 degrees to 160 degrees with the main cutting edges. According to a further configuration according to the present application, a tangent positioned at the cutting edge formed by the projecting sections touches the cutting corner at only one point.

According to a further configuration of the present application, the rake face adjoining the cutting corner and the projecting and recessed sections is inclined at a positive rake angle which, may possibly be in the range of between 10 degrees and 20 degrees. In addition, the top and the bottom surface have a center plateau region of raised design, adjoining which is a concave flank as transition region to the rake face. This center plateau serves, together with the two opposite side faces, to promote reliable clamping of the cutting insert in place in a cutting insert holder. The transition region serves to "bend up" the chips, flowing over the rake face, in such a way that rapid chip breaking occurs, whereby long snarling chips are avoided or diminished.

According to a further configuration of the present application, the cutting insert described above is used for machining rotated workpieces, such as crankshafts, at least one cutting insert first being fed in onto the workpiece in the radial direction and then being moved relative to the workpiece in the axial direction. This cutting insert faces a center bearing during the recessing movement and then, for the finish machining, machines a smooth surface on a cylindrical journal by an axial movement.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Further details of the present application follow from the drawings, in which.

DESCRIPTION OF EMBODIMENT OR EMBODIMENTS

Figure 1:
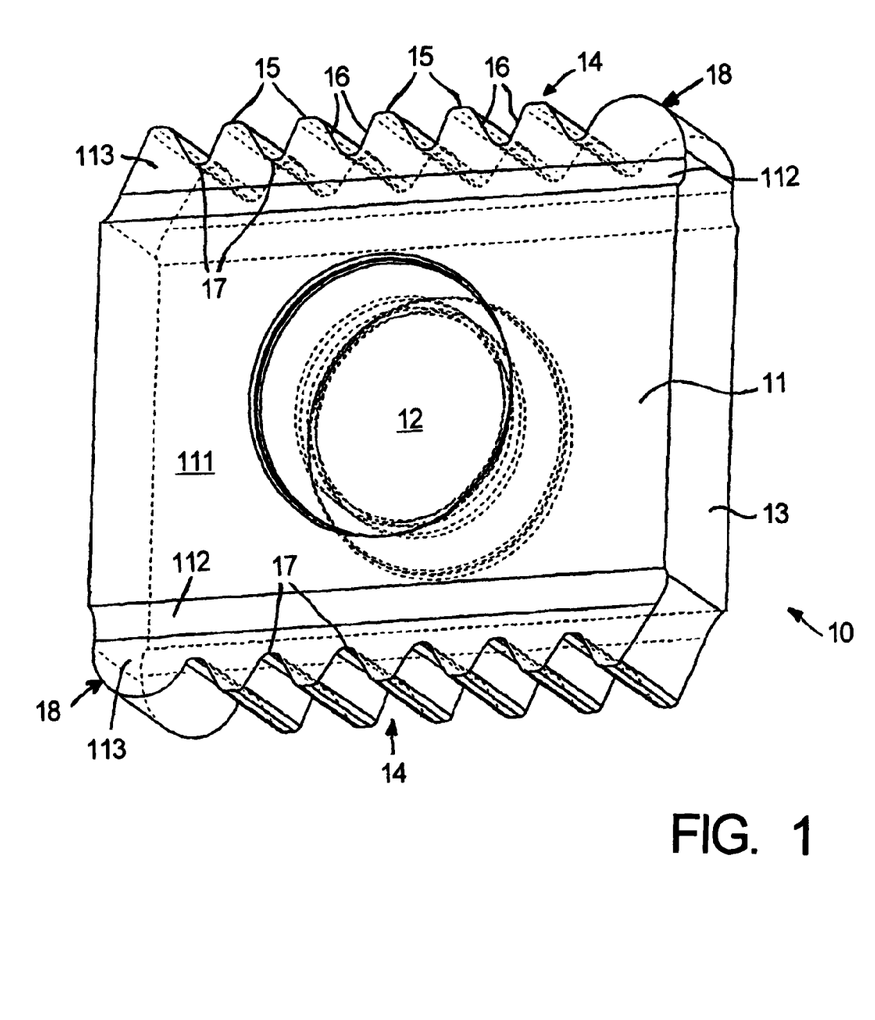
FIG. 1 shows a perspective view of the cutting insert according to the present application.

FIG. 1 shows the cutting insert 10 according to at least one possible embodiment of the present application, which has a top surface 11 and a surface opposite this top surface. These surfaces are at least essentially parallel, wherein a center plateau 111, a flank 112 falling away concavely and a rake face 113 on both sides of the center plateau 111 are each formed on both sides. A hole 12 for accommodating a fastening screw passes through the surfaces 11. The top and the bottom surfaces 11 are connected to one another by four side faces disposed perpendicularly or relatively perpendicularly thereto, wherein the opposite side faces 13, which are arranged parallel or relatively parallel to one another, and the opposite faces 14 formed with projections and recesses, connect the top and the bottom surface 11 to one another. The comb-like profile comprises trapezoidal projections which have main cutting edges 15 which lie in a line and are flanked on both sides by secondary cutting edges 16 which run out to a likewise planar root 17. The trapezoidal profile is repeated six times in the present case, the main cutting edges 15 likewise lying on a line, which at the same time also forms a tangent to the cutting corner 18. This cutting corner 18 is designed as an essentially semi-cylindrical body over the entire side face 14, the cutting corner radius being 0.4 millimeter. Such cutting corners 18 are formed diametrically opposite one another on each side, such that four useful comb-profile-like lips and four cutting corners are formed.

Figure 2A:
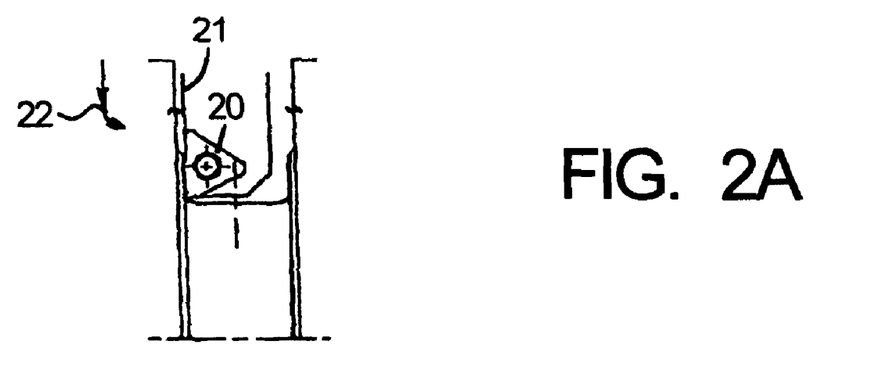
FIGS. 2A, 2B, and 2C show sketches of different machining sequences which are possible according to the prior art.
Figure 2B:
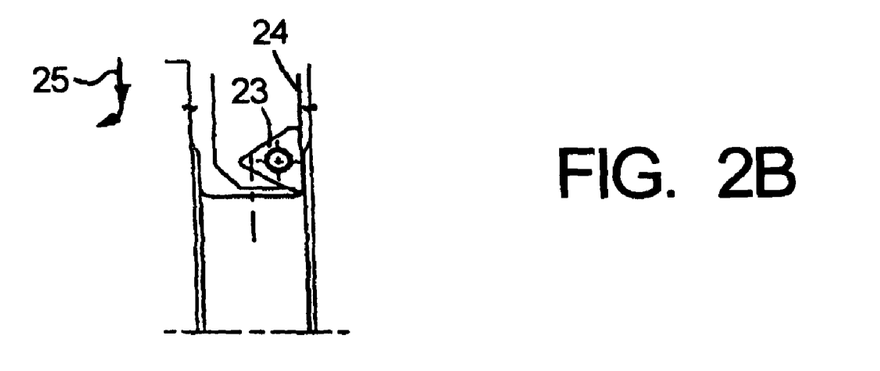
Figure 2C:
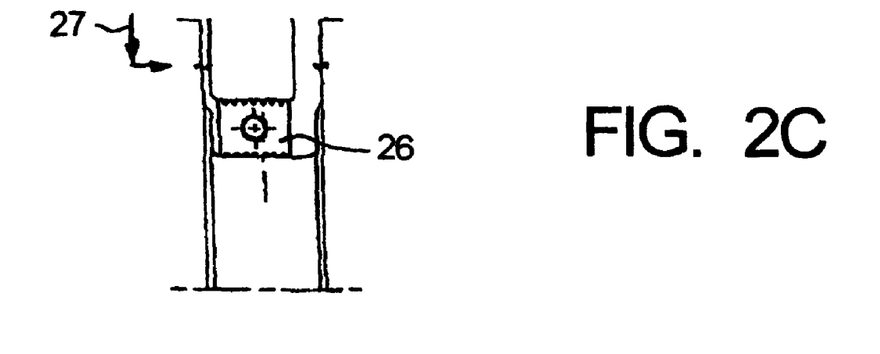
Figure 3A:
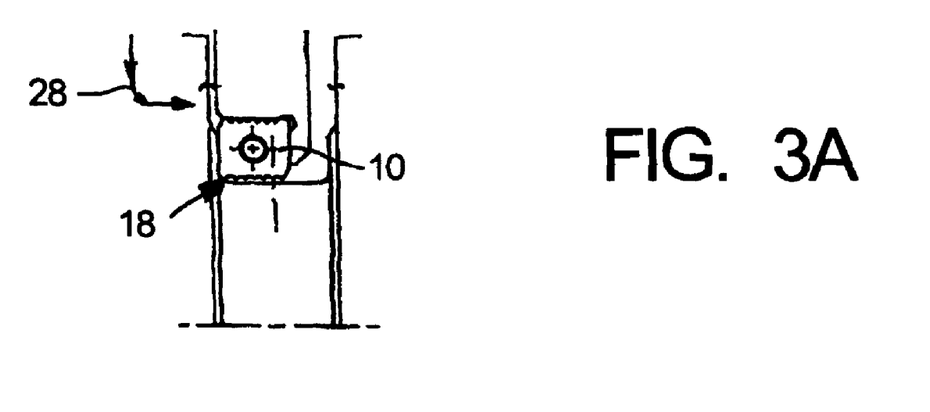
FIGS. 3A and 3B show sketches of different machining sequences according to at least one possible embodiment of the present application.
Figure 3B:
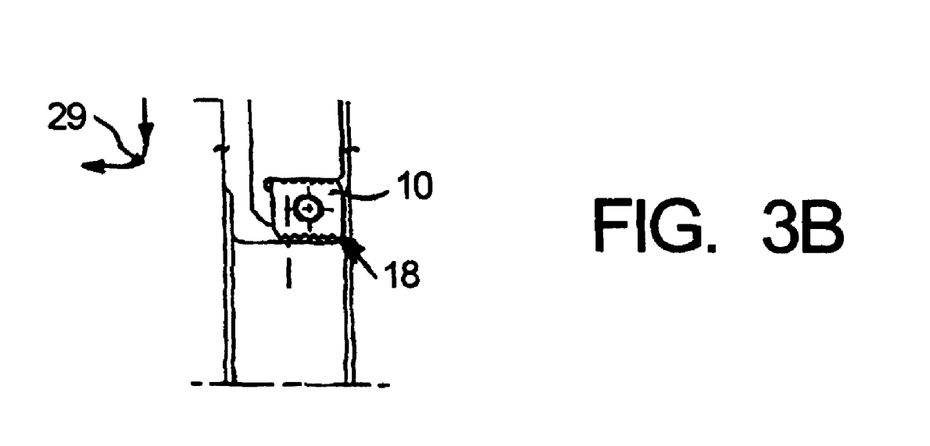

Shown in FIGS. 2A, 2B, and 2C are the machining steps according to the prior art which may be used for producing a center bearing of a crankshaft. To this end, in a first step according to FIG. 2A, an indexable insert is used which is triangular in plan view and has a corner radius of, for example, 1.2 millimeter and with which a web 21 shown on the left in the figure is faced. After the recessing movement, during which the tool 20 is fed radially onto the workpiece (from top to bottom in the drawing), the tool 20 is then directed to the right according to the curved arrow 22 and is directed in a longitudinal-turning manner along a journal surface. After this, the tool 20 is swung out and another tool 23, as shown in FIG. 2B, having the same contour is fed in for machining and finishing a web 24. The movement consisting of radial recessing and swinging into position is made clear schematically by arrow 25. In this way, first rough machining is carried out, after which a tool 26 having a comb-like cutting edge which is shorter than the longitudinal axial extent of the bearing root is fed in and is then directed, as can be seen from arrows 27, over the bearing root for the longitudinal axial turning. However, markedly reduced machining times result if work is carried out using a tool 10 according to according to FIGS. 3A and 3B, which tool 10 combines the tools 20 or 23 and 26. The cutting insert 10 is first fed in radially in the manner shown in FIGS. 3A and 3B, the cutting corner 18 being used for the facing of a center bearing. By subsequent swinging into position, as can be seen from the arrow sequence 28, the tool is directed over the bearing root or outer surface, whereby approximately half of the latter is finish-machined. Another tool 10 is then fed in radially in the same way and, after finishing of the faced center bearing, is directed in a longitudinally axial manner over the bearing root according to arrow sequence 29, such that a completely machined bearing surface is obtained overall. With the cutting insert 10, two combined movements can therefore be carried out which replace the tools 20 or 23 and 26 required hitherto. This simplifies stock-keeping and reduces the machining time.

The cutting insert 10 is suitable for the machining of non-ferrous metals, iron and cast metal, and for the machining of crankshafts. The cutting insert 10 may be made of an uncoated carbide or cermet or appropriately coated workpieces, depending on workpiece and machining parameters.

Figure 4A:
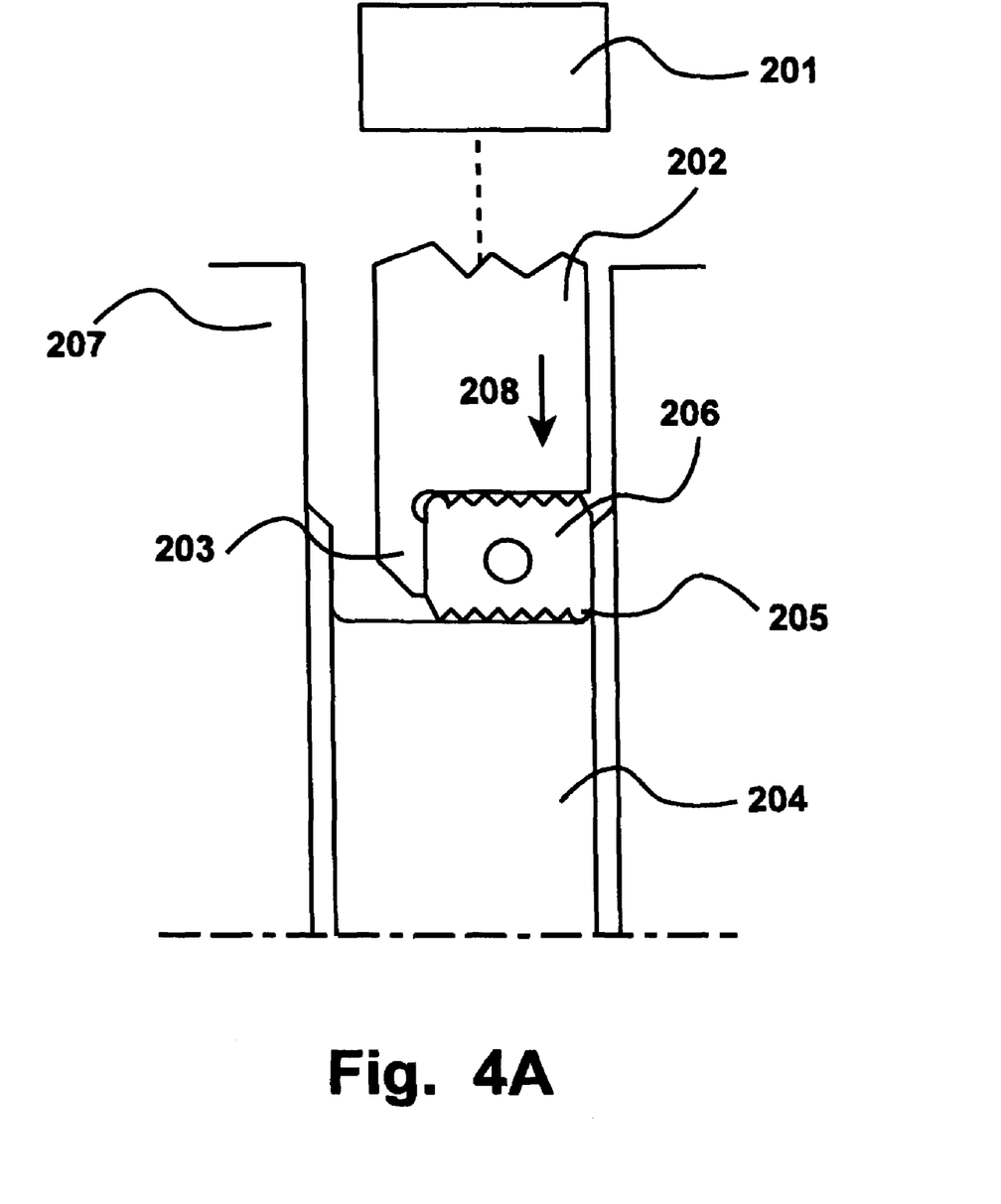
FIGS. 4A, 4B, 5A, and 5B show different steps of at least possible embodiment of a method of machining a crankshaft using machining tools, each of which comprises a cutting insert according to at least one possible embodiment.

FIGS. 4A, 4B, 5A, and 5B show different steps of at least one possible embodiment of a method of machining a crankshaft using machining tools, each of which comprises a cutting insert according to at least one possible embodiment. FIG. 4A shows the first step in machining a crankshaft. A control and movement arrangement 201 is operatively connected to a tool 202. The tool 202 comprises a reinforcing or support arm 203. The arm 203 assists in centering and supporting a cutting insert 206 during a cutting or machining operation. The cutting insert 206 is of the same design as the cutting insert 10 shown in FIG. 1. The cutting insert 206 has a number of ridge-like projections or teeth which project from opposing sides. The cutting insert 206 also has a pair of rounded cutting corners 205. In a machining operation, the tool 202 and the cutting insert 206 held therein are advanced in a direction 208 toward the surface of a bearing section 204 located between projecting portions 207 of the crankshaft. The path of movement of the tool 202 is radial and perpendicular to the central rotational or longitudinal axis of the crankshaft. The tool 202 is positioned such that the cutting insert 206 first machines an annular base surface disposed about one end of the bearing section 204 as the tool 202 is advanced toward the outer surface of the bearing section 204.

Figure 4B:
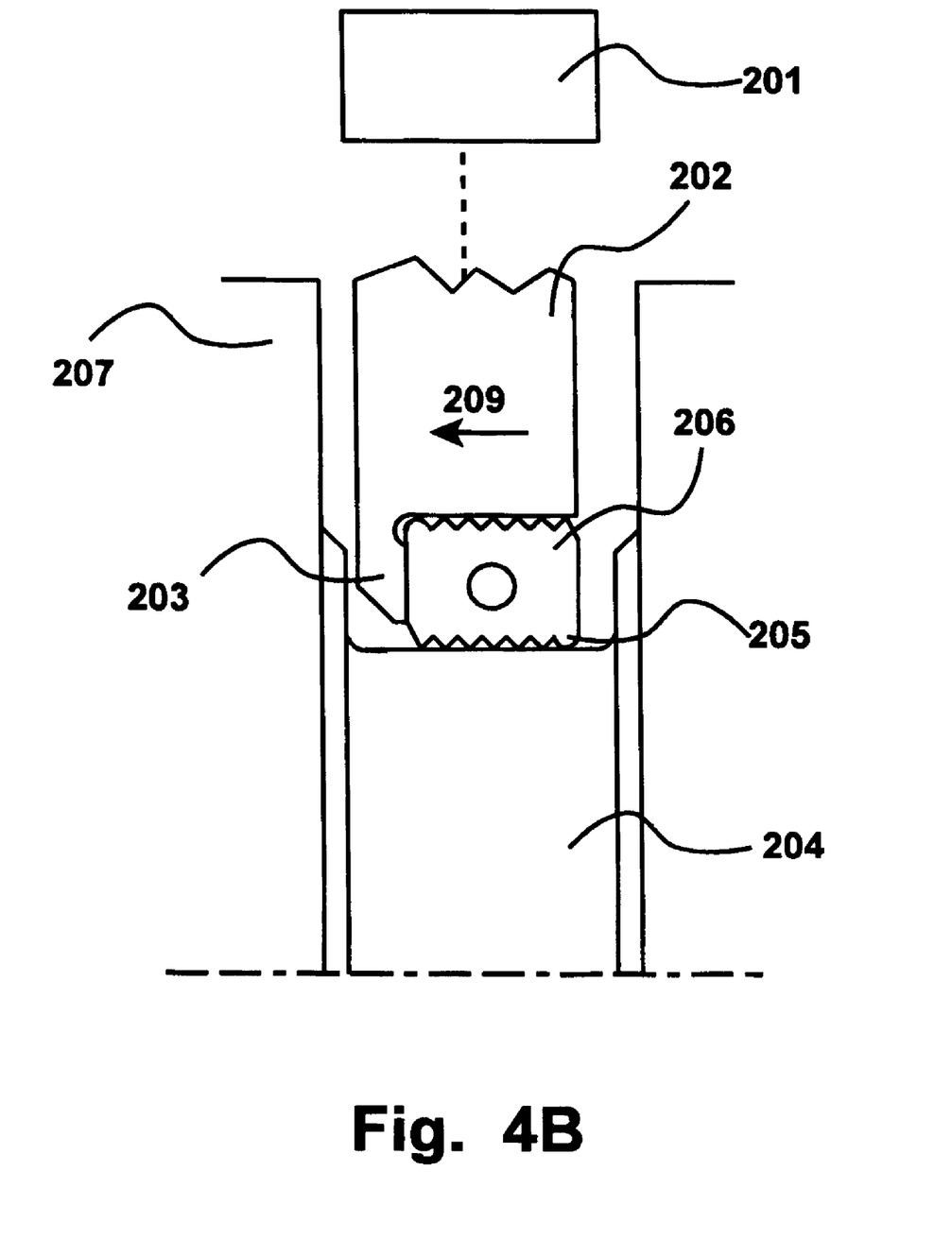
Figure 5A:
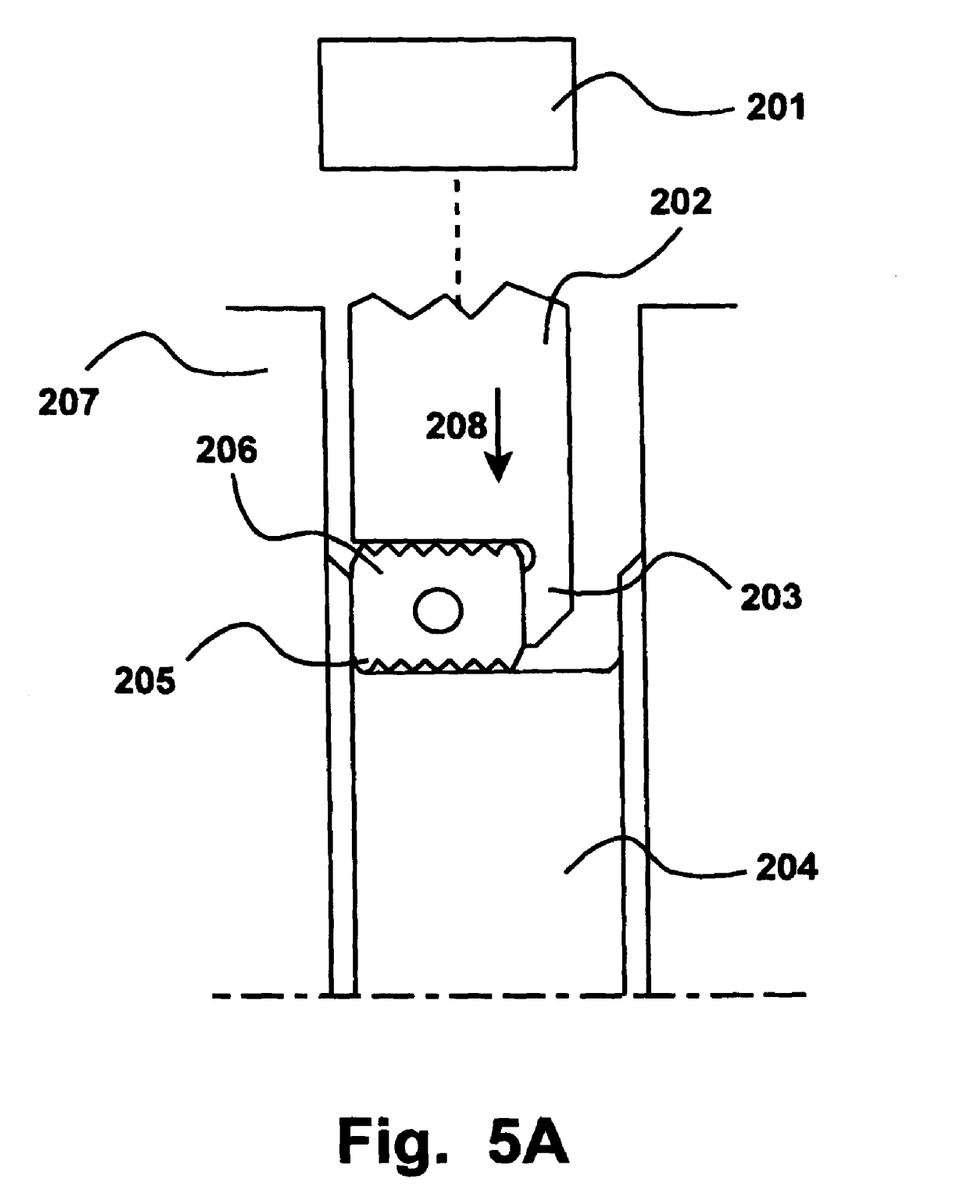
Figure 5B:
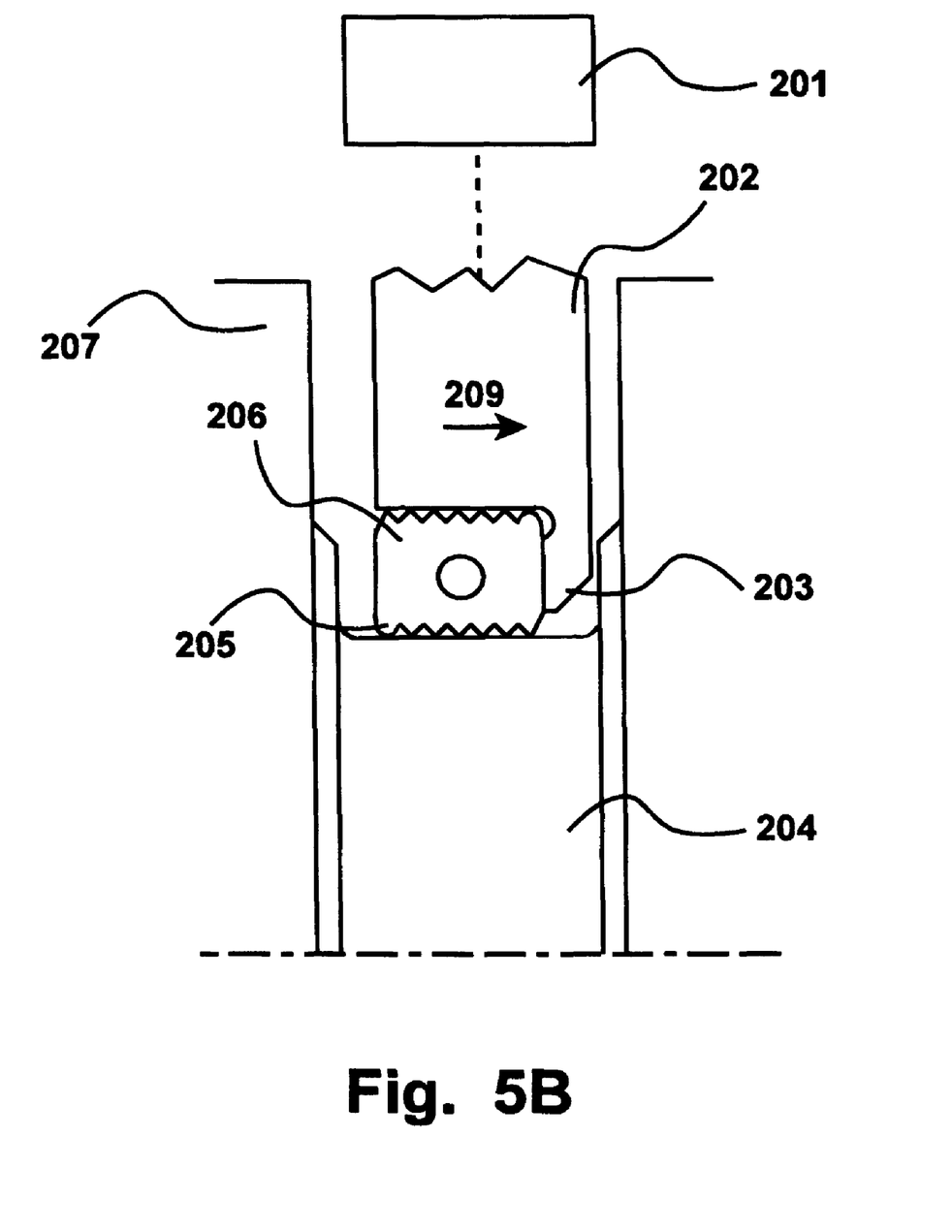

Upon reaching a desired depth of cut in the outer surface of the bearing section 204, the tool 202 stops moving in the radial direction 208 and substantially simultaneously begins moving in a direction 209 that is parallel to the central rotational or longitudinal axis of the crankshaft. This axial movement can be clearly seen in FIG. 4B. At this time the cutting projections or teeth of the cutting insert 208 machine at least half or at least approximately half of the outer surface of the bearing section 204 of the crankshaft. Upon completion of the axial movement in the direction 209, the tool 202 is removed from engagement with the crankshaft. Another tool 202, as shown in FIG. 5A, is then moved into position for machining the crankshaft. The only difference between the tool 202 shown in FIGS. 5A and 5B and the tool 202 shown in FIGS. 4A and 4B is that the arm 203 is positioned on the opposite side of the cutting insert 206. The tool 202 shown in FIGS. 5A and 5B otherwise operates in the exact same manner as a tool 202 shown in FIGS. 4A and 4B. The tool 202 is first moved in a direction 208 to machine an annular base surface disposed about the other end of the bearing section 204. Upon reaching a desired depth of cut in the outer surface of the bearing section 204, the tool 202 stops moving in the radial direction 208 and substantially simultaneously begins moving in a direction 209 that is parallel to the central rotational or longitudinal axis of the crankshaft. This axial movement can be clearly seen in FIG. 5B. At this time the cutting projections or teeth of the cutting insert 208 machine the remaining unfinished portion of the outer surface of the bearing section 204 of the crankshaft. Upon completion of the axial movement in the direction 209, the tool 202 is removed from engagement with the crankshaft and the machining process is complete.

In the embodiment shown in FIGS. 4A-5B, the bearing section 204 of the crankshaft can be machined and finished in two steps using a single type of cutting insert, as opposed to the prior art methods which involve at least four machine steps using at least two different types of cutting inserts. The device and method shown in FIGS. 4A-5B thereby effectively cut the machining time at least by half. Such a reduction in machining time would result in reduced costs for machining the crankshafts or other similar workpieces, which would be a significant advantage over the prior art methods and devices.

Figure 6:
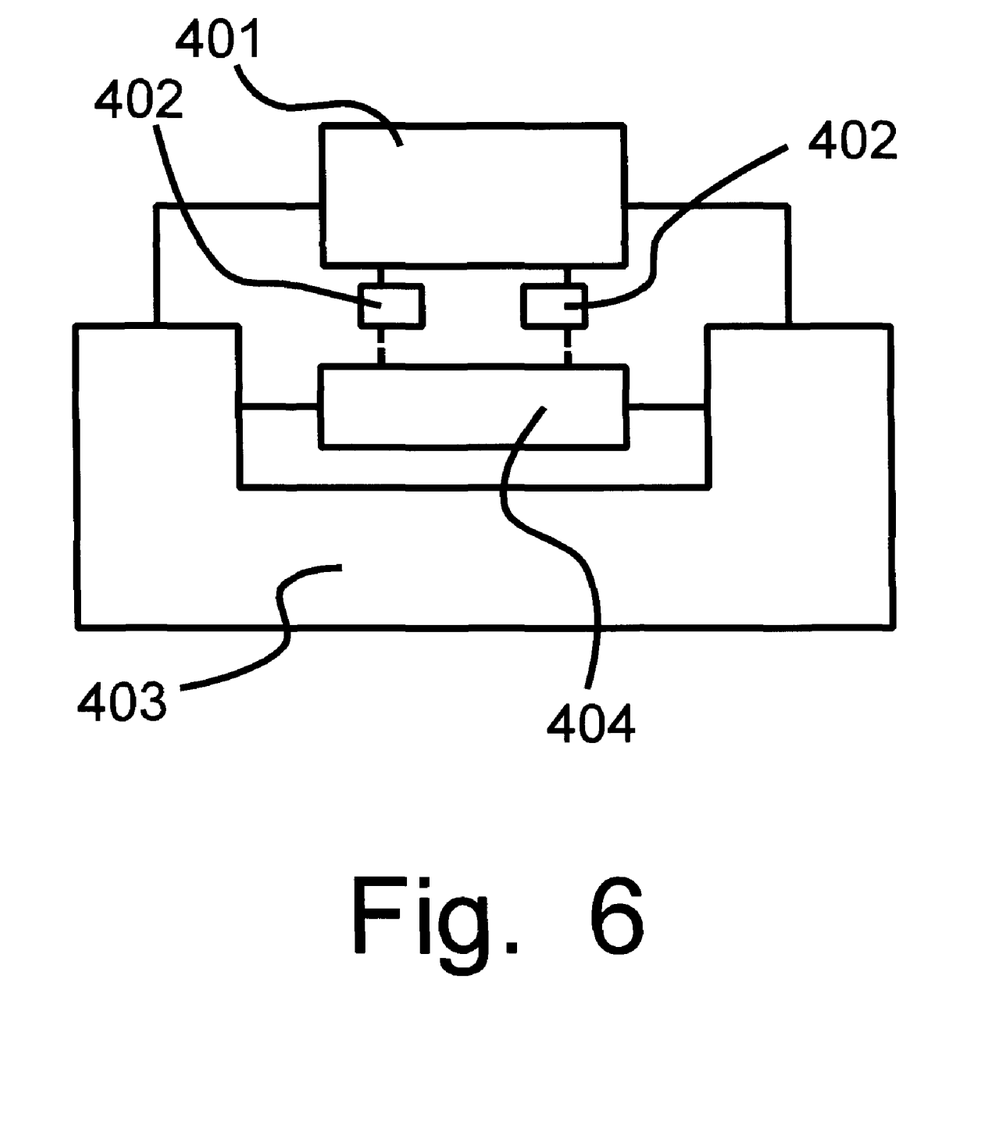
FIG. 6 shows a block diagram of a tool arrangement for machining workpieces, such as crankshafts.

FIG. 6 shows a block diagram of a tool arrangement for machining workpieces, such as crankshafts, in accordance with at least one possible embodiment. The tool arrangement comprises a lathe-like machine 403 which supports a workpiece 404, such as a crankshaft. The machine 403 also is connected to and supports a tool control and movement device 401. The device 401 is connected to and controls the movement of tools 402. The tools 402 each comprise a cutting insert such as the one shown in FIG. 1. In a machining operation, the machine 403 rotates the workpiece 404, while the device 401 moves the tools 402 and their cutting inserts, either individually or possibly at the same time, into engagement with the workpiece 404 to machine the workpiece 404. It should be understood that although only two tools 402 are shown, the device 401, in at least one possible embodiment, may control and move a plurality of tools 402.

The following patents, patent applications or patent publications, are hereby incorporated by reference as if set forth in their entirety herein: EP 1 087 853 B2, published on Apr. 4, 2001, having the title "CUTTING BIT, CUTTING TOOL AND METHOD FOR MACHINING, ESPECIALLY ROTATIONALLY SYMMETRICAL WORK PIECE SURFACES;" DE 41 35 681 C3, published on Feb. 11, 1999, having the title "PROCESS FOR MACHINING ROTATIONALLY SYMMETRICAL SURFACES, ESPECIALLY CRANKSHAFTS, AS WELL AS TOOL FOR CARRYING OUT SUCH A PROCESS;" and U.S. Pat. No. 4,876,617, published on Oct. 24, 1989, having the title "SIGNAL IDENTIFICATION."

The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

One feature or aspect of an embodiment is believed at the time of the filing of this patent application to possibly reside broadly in a cutting insert which has a prismatic basic shape and has a top and a bottom surface 11 which are arranged parallel or relatively parallel to one another and are connected by four side faces which are arranged perpendicularly or relatively perpendicularly thereto and of which two opposite side faces 14 have projecting and recessed sections, which together with the top and the bottom surface 11 form respective cutting edges, and of which the two other opposite side faces 13 are arranged in a planar manner and parallel or relatively parallel to one another, wherein at least one cutting corner 18 formed by two side faces adjoining one another is designed as a cutting edge.

Another feature or aspect of an embodiment is believed at the time of the filing of this patent application to possibly reside broadly in the cutting insert, wherein the cutting corner 18 is round and has a corner radius of 0.3 millimeter to 0.5 millimeter, often 0.4 millimeter.

Yet another feature or aspect of an embodiment is believed at the time of the filing of this patent application to possibly reside broadly in the cutting insert, comprising two respective diametrically opposite cutting corners 18 on the top and the bottom surface.

Still another feature or aspect of an embodiment is believed at the time of the filing of this patent application to possibly reside broadly in the cutting insert, wherein the cutting corners define an essentially semicylindrical section on the side faces.

A further feature or aspect of an embodiment is believed at the time of the filing of this patent application to possibly reside broadly in the cutting insert, wherein the projecting and recessed sections are of trapezoidal design as viewed in plan view, wherein the projecting sections lying next to one another form main cutting edges 15 which lie in a line and which each merge laterally into secondary cutting edges 16 which enclose an angle of 120 degrees to 160 degrees with the main cutting edges 15.

Another feature or aspect of an embodiment is believed at the time of the filing of this patent application to possibly reside broadly in the cutting insert, wherein a tangent positioned at the cutting edge formed by the projecting sections touches the cutting corner 18 tangentially at one point.

Yet another feature or aspect of an embodiment is believed at the time of the filing of this patent application to possibly reside broadly in the cutting insert, wherein the rake face 113 adjoining the cutting corner 18 and the projecting and recessed sections is inclined at a positive rake angle which is between 10 degrees and 20 degrees.

Still another feature or aspect of an embodiment is believed at the time of the filing of this patent application to possibly reside broadly in the cutting insert, wherein the top and the bottom surface 11 have a center plateau region 111 of raised design, adjoining which is a concave flank 112 as transition region to the rake face 113.

A further feature or aspect of an embodiment is believed at the time of the filing of this patent application to possibly reside broadly in a method of machining rotated workpieces, such as crankshafts, at least one cutting insert first being fed in onto the workpiece in the radial direction and then being moved relative to the workpiece in the axial direction, wherein a cutting insert 18 is first moved radially for facing a center bearing and is then moved axially for the finish machining of a bearing root.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that any or all the examples of patents, published patent applications, and other documents which are included in this application and including those which are referred to in paragraphs which state "Some examples of . . . which may possibly be used in at least one possible embodiment of the present application . . . " may possibly not be used or useable in any one or more or any embodiments of the application.

The sentence immediately above relates to patents, published patent applications and other documents either incorporated by reference or not incorporated by reference.

All of the patents, patent applications or patent publications, which were cited in the International Search Report dated Aug. 1, 2007, and/or cited elsewhere are hereby incorporated by reference as if set forth in their entirety herein as follows: U.S. Pat. No. 4,794,665, published on Jan. 3, 1989, having the title "ROTARY CUTTER WITH SERRATED EDGES AND POSITIVE/NEGATIVE AXIAL RAKE;" U.S. Pat. No. 4,867,616, published on Sep. 19, 1989, having the title "CUTTING INSERTS AND TOOLS INCLUDING SAME;" JP 07 314205, published on Dec. 5, 1995, having the title "CUTTING TOOL FOR CUTTING GROOVE"; DE 41 35 681, published on Feb. 11, 1999, and having the English translation of the title "PROCESS FOR MACHINING ROTATIONALLY SYMMETRICAL SURFACES, ESPECIALLY CRANKSHAFTS, AS WELL AS TOOL FOR CARRYING OUT SUCH A PROCESS;" and EP 1 087 853, published on Apr. 4, 2001, having the title "CUTTING BIT, CUTTING TOOL AND METHOD FOR MACHINING, ESPECIALLY ROTATIONALLY SYMMETRICAL WORK PIECE SURFACES."

In addition, some examples of devices and methods for machining crankshafts that may possibly be utilized or adapted for use in at least one possible embodiment may possibly be found in the following U.S. Pat. No. 7,065,848 to Robotta, et al., issued Jun. 27, 2006; U.S. Pat. No. 6,397,463 to Assie, issued Jun. 4, 2002; U.S. Pat. No. 6,161,991 to Kumazawa, et al., issued Dec. 19, 2000; U.S. Pat. No. 6,149,502 to Shimomura, issued Nov. 21, 2000; and U.S. Pat. No. 4,679,973 to Kodama, et al., issued Jul. 14, 1987.

The purpose of incorporating U.S. patents, foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The corresponding foreign and international patent publication applications, namely, Federal Republic of Germany Patent Application No. 10 2006 016 626.4, filed on Apr. 6, 2006, having inventor Klaus SERWUSCHOK, and DE-OS 10 2006 016 626.4 and DE-PS 10 2006 016 626.4, and International Application No. PCT/DE2007/000598, filed on Apr. 3, 2007, having WIPO Publication No. WO2007/112734 and inventor Klaus SERWUSCHOK, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The purpose of incorporating the Foreign equivalent patent application PCT/DE2007/000598 and German Patent Application 10 2006 016 626.4 is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/DE2007/000598 and DE 10 2006 016 626.4 from which this patent application claims priority which do not have to do with the correction of the translation in this patent application are not to be included in this patent application in the incorporation by reference.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A method of machining crankshafts using a machining tool arrangement, said machining tool arrangement comprising:
    a lathe device being configured and disposed to support and rotate a crankshaft workpiece;
    a control and movement arrangement being connected to and supported by said lathe device;
    a first tool and a second tool being connected to and supported by said control and movement arrangement;
    said control and movement arrangement being configured to control the movement of said first tool and said second tool in a machining operation;
    each of said first tool and said second tool comprising a cutting insert;
    said cutting insert comprising:
        a first surface, a second surface opposite said first surface, and four side surfaces;
        said first surface and said second surface being arranged substantially parallel to one another and being connected by said four side surfaces;
        said four side surfaces being disposed transverse to said first and second surfaces;
        said four side surfaces comprising first and second planar side surfaces being disposed opposite and substantially parallel to one another, and first and second contoured side surfaces being disposed opposite to one another;

said first contoured side surface comprising a plurality of alternating projecting and recessed sections to form, together with said first and second surfaces, a first plurality of cutting teeth;

said second contoured side surface comprising a plurality of alternating projecting and recessed sections to form, together with said first and second surfaces, a second plurality of cutting teeth;

said first plurality of cutting teeth comprising a rounded, corner cutting tooth being disposed at the intersection of said first contoured side surface and said first planar side surface;

said second plurality of cutting teeth comprising a rounded, corner cutting tooth being disposed at the intersection of said second contoured side surface and said second planar side surface; and each of said cutting teeth comprising a substantial portion of a circular cylinder having a cylinder axis being transverse to said first surface and said second surface;

said method comprising the steps of:

placing a crankshaft workpiece into said lathe device;

activating said lathe device to rotate the crankshaft workpiece;

activating said control and movement arrangement and moving said first tool toward the crankshaft workpiece in a radial direction with respect to the central rotational axis of a bearing section of the crankshaft workpiece;

continuing moving said first tool and its cutting insert in the radial direction and machining, with said corner cutting tooth of said first plurality of teeth, a first base surface disposed about and extending radially away from a first end of the bearing section;

continuing moving said first tool in the radial direction and machining with said first plurality of teeth a portion of a longitudinal surface of the bearing section parallel to the central rotational axis of the bearing section until a desired depth of cut is achieved, and then at least substantially simultaneously beginning moving said first tool in an axial direction with respect to the central rotational axis of the bearing section away from the first base surface;

continuing moving said first tool in the axial direction along the longitudinal surface of the bearing section and machining with said first plurality of cutting teeth a substantial portion of the longitudinal surface of the bearing section;

moving said first tool out of engagement with said crankshaft workpiece;

moving said second tool toward the crankshaft workpiece in the radial direction;

continuing moving said second tool and its cutting insert in the radial direction and machining, with said corner cutting tooth of said first plurality of teeth, a second base surface disposed about and extending radially away from a second end of the bearing section;

continuing moving said second tool in the radial direction and machining with said first plurality of teeth another portion of the longitudinal surface of the bearing section until a desired depth of cut is achieved, and then at least substantially simultaneously beginning moving said second tool in the axial direction away from the first base surface;

continuing moving said second tool in the axial direction along the longitudinal surface of the bearing section and machining with said first plurality of cutting teeth the remaining unfinished portion of the longitudinal surface of the bearing section; and moving said second tool out of engagement with said crankshaft workpiece.

2. The method according to claim 1, wherein:

said first plurality of cutting teeth further comprises a plurality of trapezoidal cutting teeth;

said second plurality of cutting teeth further comprises a plurality of trapezoidal cutting teeth;

each of said trapezoidal cutting teeth comprises a first surface and two side surfaces extending from either side of said first surface at an obtuse angle of between 120° and 160° with respect to said first surface;

said first surfaces of said trapezoidal cutting teeth form primary cutting edges, and said side surfaces of said trapezoidal cutting teeth form secondary cutting edges;

said first surfaces of said trapezoidal cutting teeth of said first plurality of cutting teeth are disposed to lie in a line in a common plane; and said first surfaces of said trapezoidal cutting teeth of said second plurality of cutting teeth are disposed to lie in a line in a common plane.

3. The method according to claim 2, wherein:

the sections of said first and second surfaces which form a portion of said plurality of cutting teeth each comprises a rake face; and said rake faces are inclined at a positive rake angle.

4. The method according to claim 3, wherein said rake faces are inclined at a positive rake angle of between 10° and 20°.

5. The method according to claim 4, wherein:

each of said first and the second surfaces comprises a raised, central section; and each of said first and the second surfaces comprises concave flank surfaces disposed between and to connect said rake faces and said raised central section.

6. The method according to claim 5, wherein a tangent extending from said first surfaces of said trapezoidal cutting teeth touches the corresponding corner cutting tooth tangentially at one point; and each of said corner cutting teeth has a radius of curvature of 0.3 mm to 0.5 mm, or has a radius of curvature of 0.4 mm.

7. A crankshaft machining tool insert comprising:

a first surface, a second surface opposite said first surface, and four side surfaces;

said first surface and said second surface being arranged substantially parallel to one another and being connected by said four side surfaces;

said four side surfaces being disposed transverse to said first and second surfaces;

said four side surfaces comprising first and second planar side surfaces being disposed opposite and substantially parallel to one another, and first and second contoured side surfaces being disposed opposite to one another;

said first contoured side surface comprising a plurality of alternating projecting and recessed sections to form, together with said first and second surfaces, a first plurality of cutting teeth;

said second contoured side surface comprising a plurality of alternating projecting and recessed sections to form, together with said first and second surfaces, a second plurality of cutting teeth;

said first plurality of cutting teeth comprising a rounded, corner cutting tooth being disposed at the intersection of said first contoured side surface and said first planar side surface;

said second plurality of cutting teeth comprising a rounded, corner cutting tooth being disposed at the intersection of said second contoured side surface and said second planar side surface; and each of said cutting teeth comprising a substantial portion of a circular cylinder having a cylinder axis being transverse to said first surface and said second surface.

8. The crankshaft machining tool insert according to claim 7, wherein:

said first plurality of cutting teeth further comprises a plurality of trapezoidal cutting teeth;

said second plurality of cutting teeth further comprises a plurality of trapezoidal cutting teeth;

each of said trapezoidal cutting teeth comprises a first surface and two side surfaces extending from either side of said first surface at an obtuse angle of between 120° and 160° with respect to said first surface;

said first surfaces of said trapezoidal cutting teeth form primary cutting edges, and said side surfaces of said trapezoidal cutting teeth form secondary cutting edges;

said first surfaces of said trapezoidal cutting teeth of said first plurality of cutting teeth are disposed to lie in a line in a common plane; and said first surfaces of said trapezoidal cutting teeth of said second plurality of cutting teeth are disposed to lie in a line in a common plane.

9. The crankshaft machining tool insert according to claim 8, wherein:

the sections of said first and second surfaces which form a portion of said plurality of cutting teeth each comprises a rake face; and said rake faces are inclined at a positive rake angle.

10. The crankshaft machining tool insert according to claim 9, wherein said rake faces are inclined at a positive rake angle of between 10° and 20°.

11. The crankshaft machining tool insert according to claim 10, wherein:

each of said first and the second surfaces comprises a raised, central section; and each of said first and the second surfaces comprises concave flank surfaces disposed between and to connect said rake faces and said raised central section.

12. The crankshaft machining tool insert according to claim 11, wherein a tangent extending from said first surfaces of said trapezoidal cutting teeth touches the corresponding corner cutting tooth tangentially at one point.

13. The crankshaft machining tool insert according to claim 12, wherein each of said corner cutting teeth has a radius of curvature of 0.3 mm to 0.5 mm, or has a radius of curvature of 0.4 mm.

14. A cutting insert comprising:

a first surface, a second surface opposite said first surface, and four side surfaces;

said first surface and said second surface being arranged substantially parallel to one another and being connected by said four side surfaces;

said four side surfaces being disposed transverse to said first and second surfaces;

said four side surfaces comprising first and second planar side surfaces being disposed opposite and substantially parallel to one another, and first and second contoured side surfaces being disposed opposite to one another;

said first contoured side surface comprising a plurality of alternating projecting and recessed sections to form, together with said first and second surfaces, a first plurality of cutting teeth;

said second contoured side surface comprising a plurality of alternating projecting and recessed sections to form, together with said first and second surfaces, a second plurality of cutting teeth;

said first plurality of cutting teeth comprising a rounded, corner cutting tooth being disposed at the intersection of said first contoured side surface and said first planar side surface; and said second plurality of cutting teeth comprising a rounded, corner cutting tooth being disposed at the intersection of said second contoured side surface and said second planar side surface.

15. The cutting insert according to claim 14, wherein:

said first plurality of cutting teeth further comprises a plurality of trapezoidal cutting teeth;

said second plurality of cutting teeth further comprises a plurality of trapezoidal cutting teeth;

each of said trapezoidal cutting teeth comprises a first surface and two side surfaces extending from either side of said first surface at an obtuse angle of between 120° and 160° with respect to said first surface;

said first surfaces of said trapezoidal cutting teeth form primary cutting edges, and said side surfaces of said trapezoidal cutting teeth form secondary cutting edges;

said first surfaces of said trapezoidal cutting teeth of said first plurality of cutting teeth are disposed to lie in a line in a common plane; and said first surfaces of said trapezoidal cutting teeth of said second plurality of cutting teeth are disposed to lie in a line in a common plane.

16. The cutting insert according to claim 15, wherein:

the sections of said first and second surfaces which form a portion of said plurality of cutting teeth each comprises a rake face; and said rake faces are inclined at a positive rake angle.

17. The cutting insert according to claim 16, wherein said rake faces are inclined at a positive rake angle of between 10° and 20°.

18. The cutting insert according to claim 17, wherein:

each of said first and the second surfaces comprises a raised, central section; and each of said first and the second surfaces comprises concave flank surfaces disposed between and to connect said rake faces and said raised central section.

19. The cutting insert according to claim 18, wherein a tangent extending from said first surfaces of said trapezoidal cutting teeth touches the corresponding corner cutting tooth tangentially at one point.

20. The cutting insert according to claim 19, wherein each of said corner cutting teeth has a radius of curvature of 0.3 mm to 0.5 mm, or has a radius of curvature of 0.4 mm.

* * * * *